(12) United States Patent
Jenko et al.

(10) Patent No.: US 7,708,551 B2
(45) Date of Patent: May 4, 2010

(54) RECONFIGURABLE HOT RUNNER

(75) Inventors: Edward Joseph Jenko, Essex, VT (US); Martin Baumann, Burlington, VT (US); Manon Danielle Belzile, Fairfield, VT (US); Patrice Fabien Gaillard, Milton, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 109 days.

(21) Appl. No.: 12/134,367

(22) Filed: Jun. 6, 2008

(65) Prior Publication Data

US 2009/0191302 A1      Jul. 30, 2009

Related U.S. Application Data

(63) Continuation-in-part of application No. 12/039,824, filed on Feb. 29, 2008, which is a continuation-in-part of application No. 12/022,226, filed on Jan. 30, 2008, now abandoned.

(51) Int. Cl.
*B29C 45/20* (2006.01)
(52) U.S. Cl. ............................... 425/549; 425/572
(58) Field of Classification Search ............... 425/549, 425/570, 572
See application file for complete search history.

(56) References Cited

U.S. PATENT DOCUMENTS

| 3,985,486 A | | 10/1976 | Hendry |
| 4,793,795 A | * | 12/1988 | Schmidt et al. ............. 425/549 |
| 4,979,892 A | * | 12/1990 | Gellert ....................... 425/549 |
| 5,000,675 A | * | 3/1991 | Gellert et al. ............... 425/549 |
| 2004/0191358 A1 | | 9/2004 | Gellert et al. |
| 2006/0159799 A1 | | 7/2006 | Trakas |

* cited by examiner

*Primary Examiner*—Tim Heitbrink
(74) *Attorney, Agent, or Firm*—Husky Intellectual Property Services

(57) ABSTRACT

A hot runner system having a melt distribution system that is reusable and reconfigurable to vary drop or nozzle locations to meet various design requirements. The melt distribution system includes a melt distributor in fluid communication with a melt source, at least one melt conduit in fluid communication with the melt distributor, and at least one nozzle in fluid communication with the at least one melt conduit. The hot runner system also includes a backing plate; a manifold plate detachably connected to the backing plate; a melt distribution system positioned between the backing plate and the manifold plate and having at least one nozzle associated therewith. The hot runner system may be configured and reconfigured to accommodate various drop or nozzle locations.

20 Claims, 15 Drawing Sheets

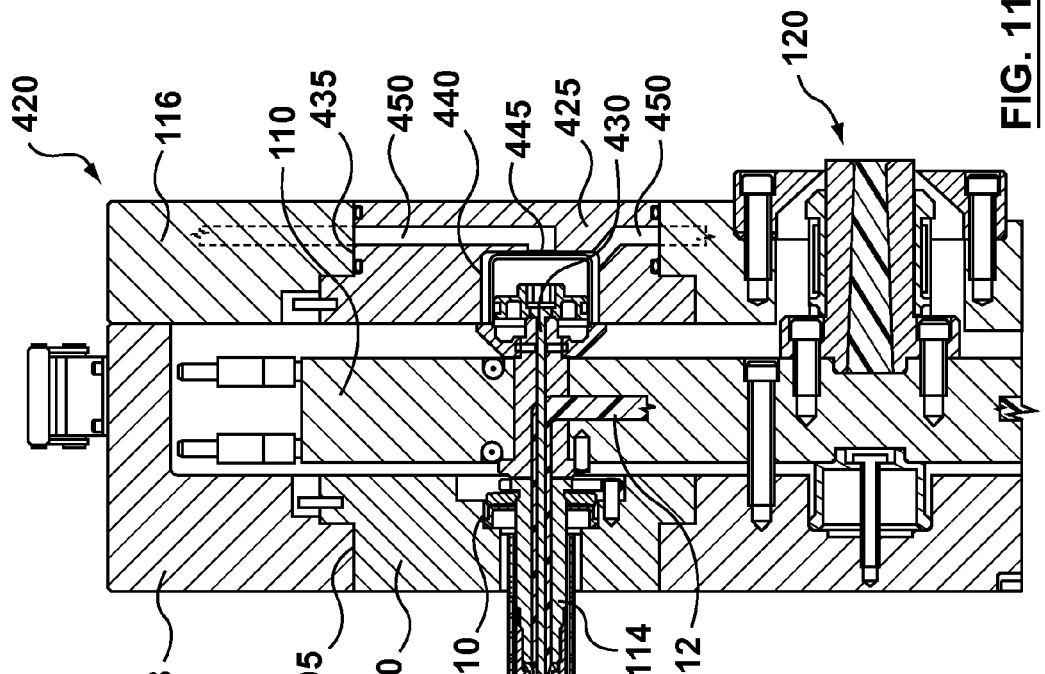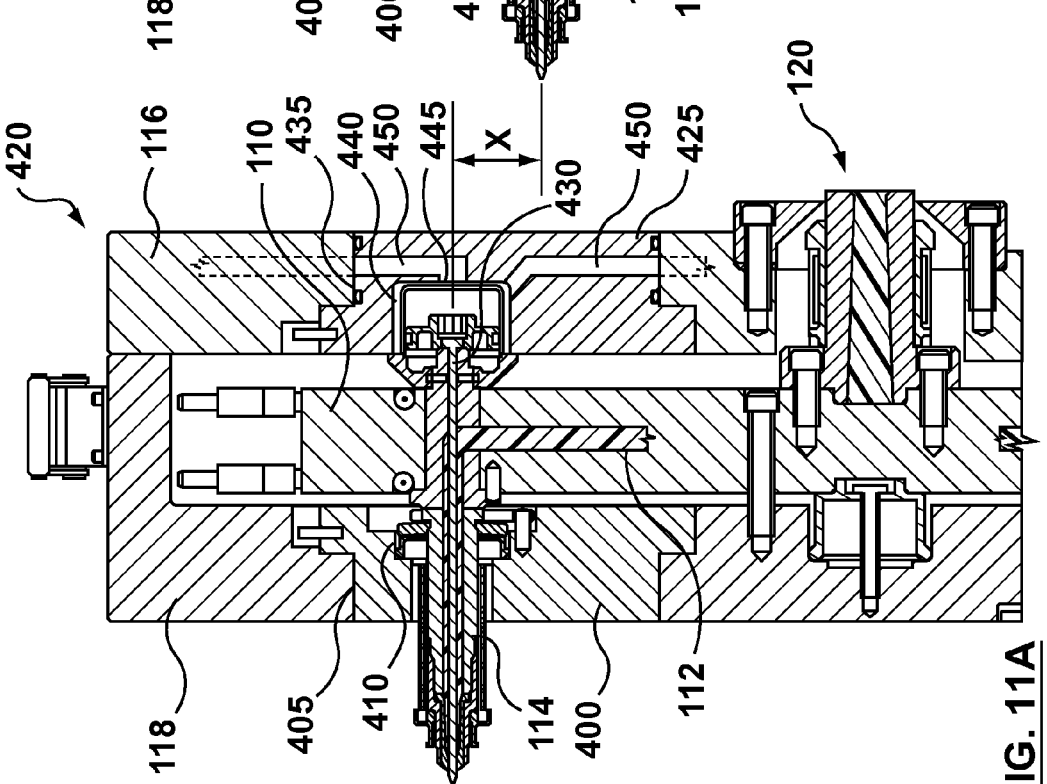

RECONFIGURABLE HOT RUNNER

CROSS REFERENCE TO RELATED APPLICATIONS

This is a continuation-in-part patent application of prior U.S. patent Ser. No. 12/039,824, filed Feb. 29, 2008, which is a continuation-in-part application of prior U.S. patent application Ser. No. 12/022,226, filed Jan. 30, 2008 now abandoned.

TECHNICAL FIELD OF THE INVENTION

The present invention relates generally to the field of injection molding and more particularly to a reconfigurable hot runner.

BACKGROUND OF THE INVENTION

A hot runner is utilized to transfer molten material, typically plastic resin, from an injection unit of an injection molding machine to at least one cavity defined in a pair of mold plates. A hot runner typically includes a manifold plate, a manifold housed in the manifold plate, and a backing plate that supports the manifold and manifold plate. The hot runner routes molten material from a central sprue, which connects to an injection unit on an injection molding machine, to a plurality of nozzles which inject the molten material into cavities in the mold. The hot runner divides the flow of molten material into several branches as it flows from the central sprue to the nozzles.

Referring now to FIG. 1, a cross-section of a hot runner 8 is shown. A manifold 10 is located between a manifold plate 12 and a backing plate 14. The manifold 10 has one or more melt channels 18 that communicate the molten material from a sprue 16 connected to the manifold 10 at a central location. The hot runner 8 has nozzles 6 in fluid connection with the manifold 10.

One limitation of this prior art hot runner 8 is that the manifold 10, manifold plate 12, and backing plate 14 must be replaced each time a new hot runner 8 is desired. The possibility of a reusable and reconfigurable manifold 10 (or melt distribution system), manifold plate 12, backing plate 14 represents a significant potential cost and time saving benefit. In addition to these cost and time benefits, lead times for a new hot runner 8 can be considerable and with the present invention significantly reduces lead time.

Therefore, it would be desirable to provide a hot runner 8 that is reusable and reconfigurable. Specifically, it would be very desirable to provide manifolds 10 (or melt distribution systems), manifold plates 12, and backing plates 14 that are reusable and reconfigurable to different drop locations. Further, it would be desirable to have nozzles 6 that are reusable as well.

The present invention is directed to meeting one or more of the above-stated desirable objectives.

SUMMARY OF THE INVENTION

One aspect of the present invention is to provide a hot runner system or components thereof that may be reused and reconfigured for various drop or nozzle location, or design requirements.

In accordance with the above aspect of the invention, there is provided a hot runner system comprising a manifold plate, a melt distribution system positioned adjacent said manifold plate and having at least one nozzle associated therewith, said at least one nozzle having an outside diameter, and wherein said manifold plate defines at least one plate slot therein, said at least one plate slot allowing said at least one nozzle to extend through said manifold plate and having at least a first lateral dimension substantially larger than said outside diameter of said at least one nozzle.

In accordance with the above aspects of the invention, the melt distribution system further includes a melt distributor for receiving melt from a source, at least one melt conduit in downstream fluid communication with the melt distributor, at least one nozzle in downstream fluid communication with and operatively connected to the at least one melt conduit, and wherein the at least one nozzle is movable from a first position to a second position in the at least one plate slot while remaining operatively connected to the at least one melt conduit and while the at least one melt conduit remains in fluid communication with the melt distributor.

In one embodiment of the melt distribution system, the melt distribution system comprises a melt distributor for receiving melt from a source, at least one melt conduit in downstream fluid communication with the melt distributor, at least one nozzle in downstream fluid communication with and operatively connected to the at least one melt conduit, and wherein the at least one nozzle is movable from a first position to a second position while remaining operatively connected to the at least one melt conduit and while the at least one melt conduit remains in fluid communication with the melt distributor.

In another embodiment of the melt distribution system, the melt distribution system comprises a melt distributor for receiving melt from a source, at least one melt conduit in downstream fluid communication with the melt distributor, at least one nozzle in downstream fluid communication with the at least one melt conduit, and wherein in non-use, the at least one melt conduit permits movement of the at least one nozzle from a first position to a second position without disconnecting the at least one nozzle from the at least one conduit of the melt distribution system.

These aspects are merely illustrative of the various aspects associated with the present invention and should not be deemed as limiting in any manner. These and other objects, aspects, features and advantages of the present invention will become apparent from the following detailed description when taken in conjunction with the referenced drawings.

BRIEF DESCRIPTION OF THE DRAWINGS

Reference is now made to the drawings which illustrate the best known mode of carrying out the invention and wherein the same reference numerals indicate the same or similar parts throughout the several views.

FIG. 11A is a cross-sectional view of a partial hot runner according to yet another embodiment of the present invention showing the nozzle insert and the piston cylinder insert in a first position.

FIG. 11B is a cross-sectional view of a partial hot runner according to another embodiment of the present invention showing the nozzle insert and the piston cylinder insert in a second position, illustrating the resulting variance in nozzle positions between FIG. 11A and FIG. 11B.

DETAILED DESCRIPTION

Figure 1:
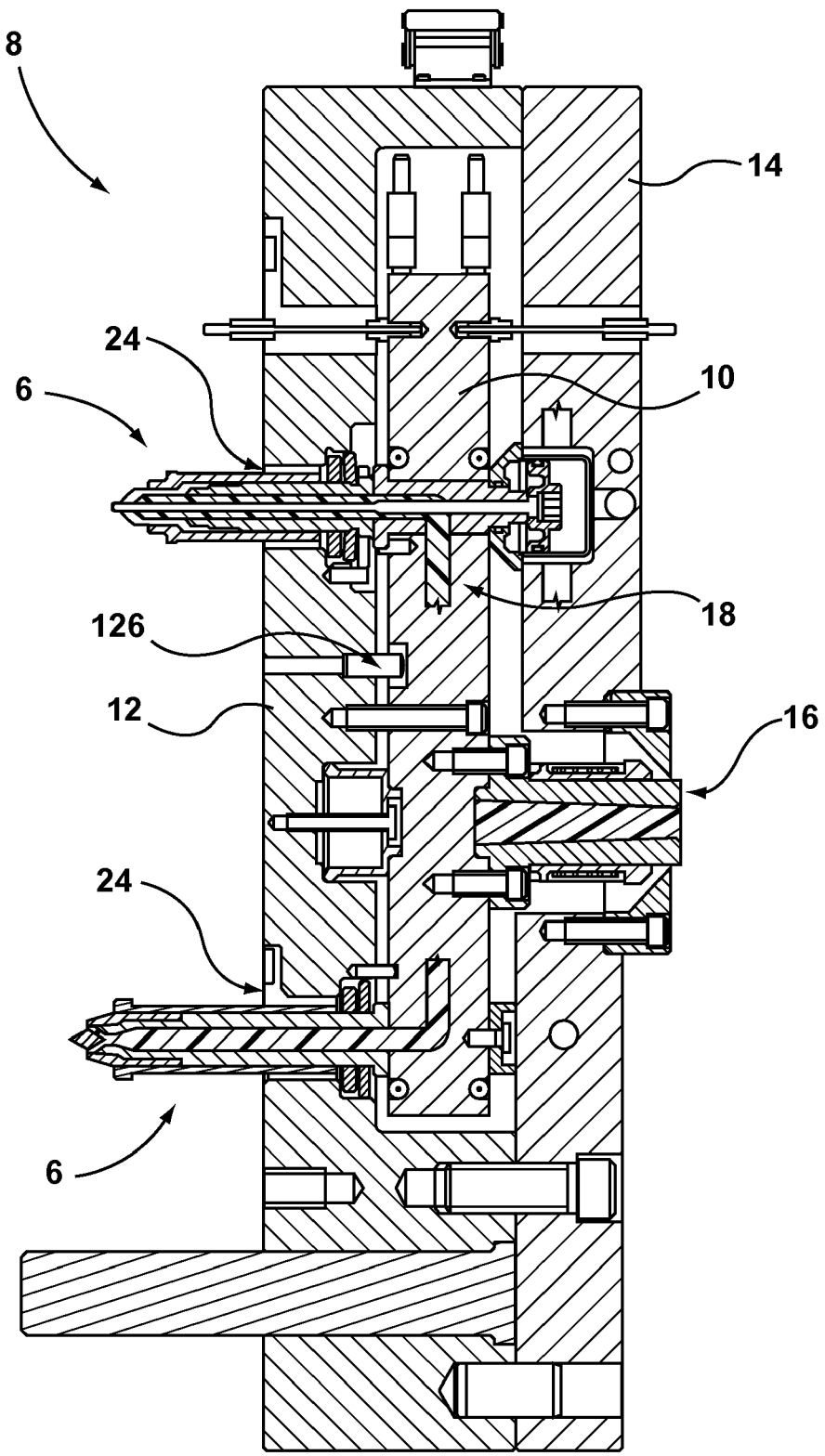
FIG. 1 is a cross-sectional view of a hot runner showing the manifold, manifold plate, backing plate, and nozzles as is known in the prior art.
Figure 2:
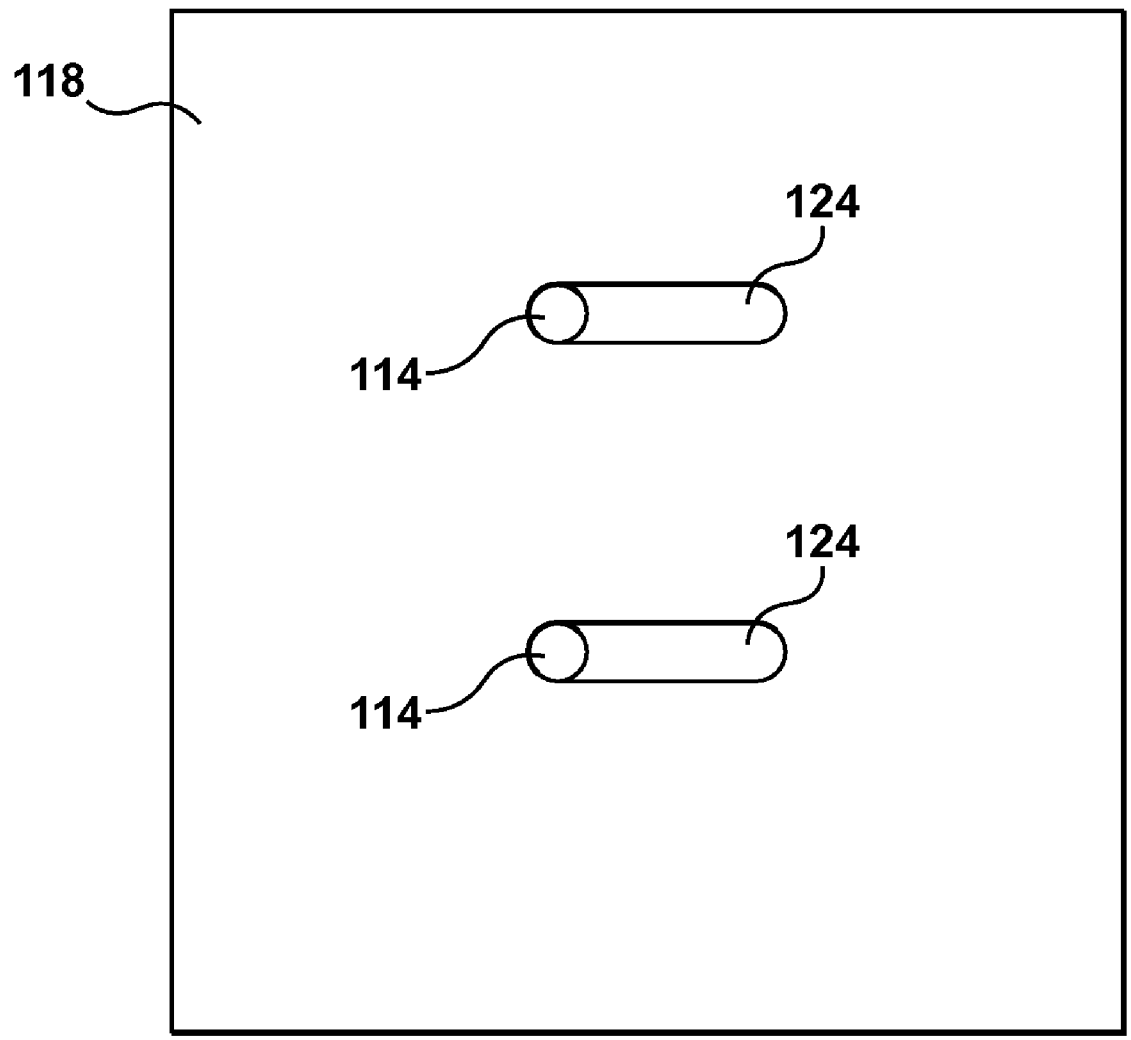
FIG. 2 is a plan view of one embodiment of the present invention showing the manifold plate with nozzles extending therethrough of a hot runner.

In the following detailed description, numerous specific details are set forth in order to provide a thorough understanding of the invention. However, it will be understood by those skilled in the art that the present invention may be practiced without these specific details. For example, well-known methods, procedures, and components have not been described in detail so as not to obscure the present invention.

FIGS. 2-7 illustrate a hot runner system 206 or parts and portions thereof according to a first embodiment of the present invention. The hot runner system 206 includes a manifold 110, having manifold melt channels 112 therethrough for molten material to travel from a sprue 120 to nozzles 114. The manifold 110 is surrounded and supported by a backing plate 116 and a manifold plate 118. The manifold 110 is, in effect, "sandwiched" between the backing plate 116 and the manifold plate 118.

Figure 8:
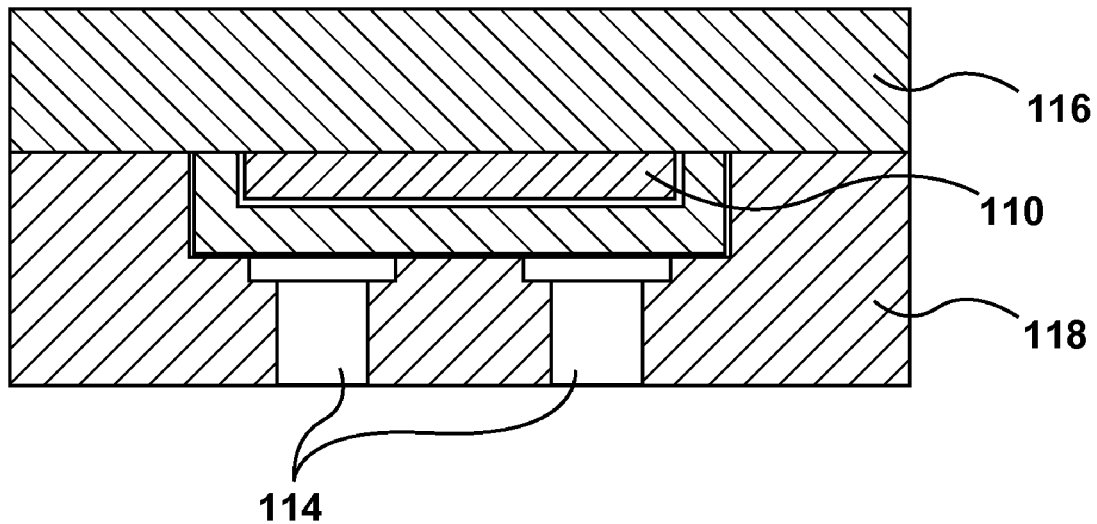
FIG. 8 is a cross-sectional view of a system according to another embodiment of the present invention.
Figure 9:
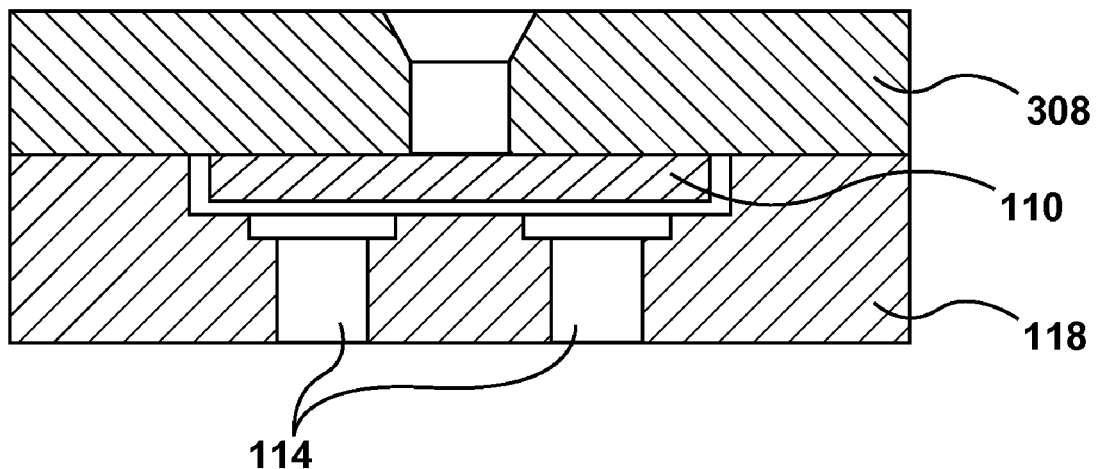
FIG. 9 is a cross-sectional view of a system according to yet another embodiment of the present invention.

Referring now to FIG. 8, the manifold 110 and nozzles 114 may be located in at least a portion of the manifold plate 118 that is either inserted or mounted to the mold plates (not shown) with the backing plate 116 taking the form of a mold plate (considered as part of the mold rather the hot runner). In another embodiment illustrated in FIG. 9, the backing plate (not shown) is eliminated and a machine platen 308 is used to contain the hot runner. Those of skill in the art will appreciate that the present invention is equally suitable for use with any of these different structural arrangements.

Figure 5:
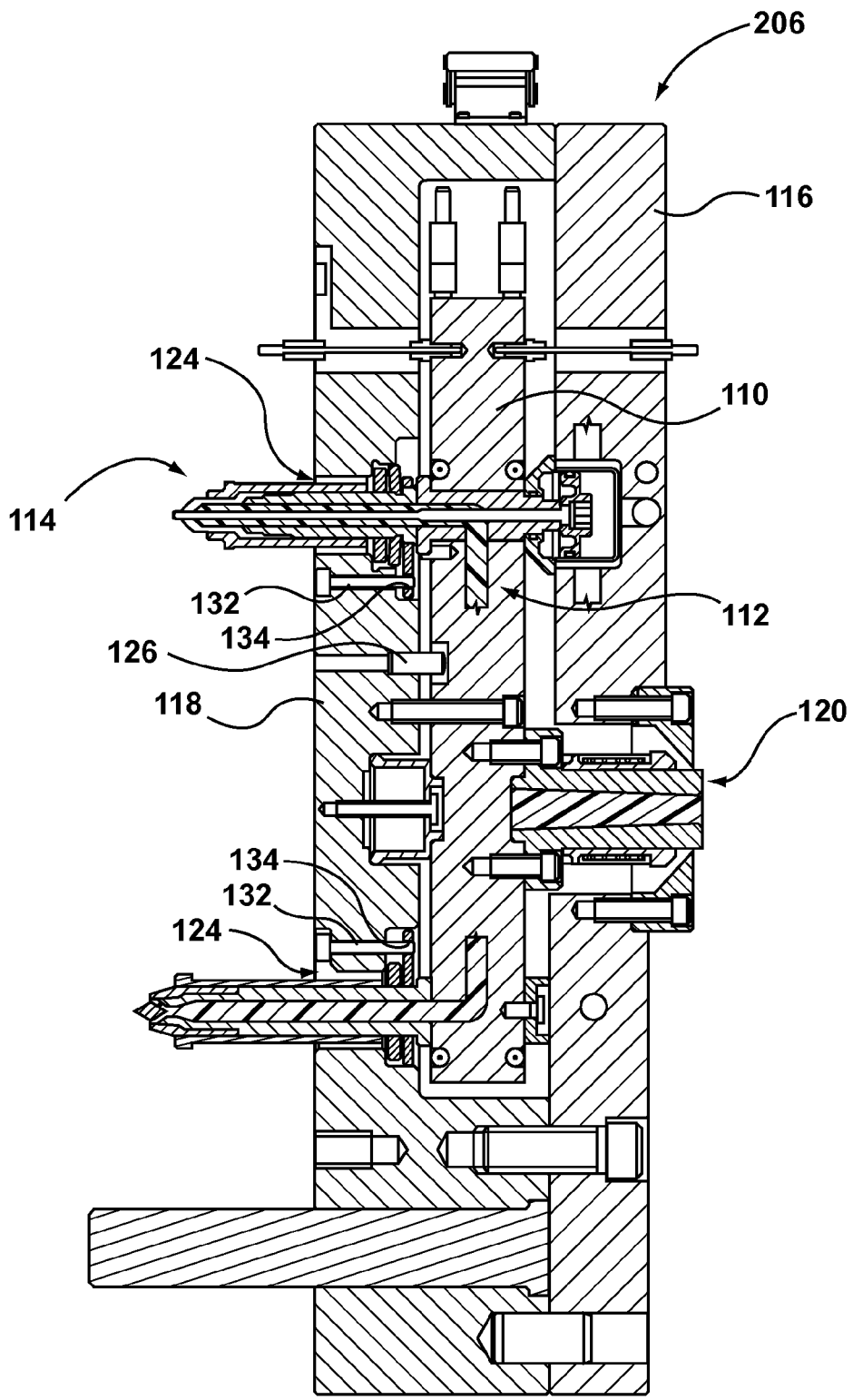
FIG. 5 is a cross-sectional view of a hot runner according to an alternate embodiment of the present invention.

As can be seen in FIG. 5, the sprue 120 delivers melt to the manifold melt channels 112 of the manifold 110. Melt then passes through to the nozzles 114, where it is delivered to each gate of the mold (not shown).

Figure 3:
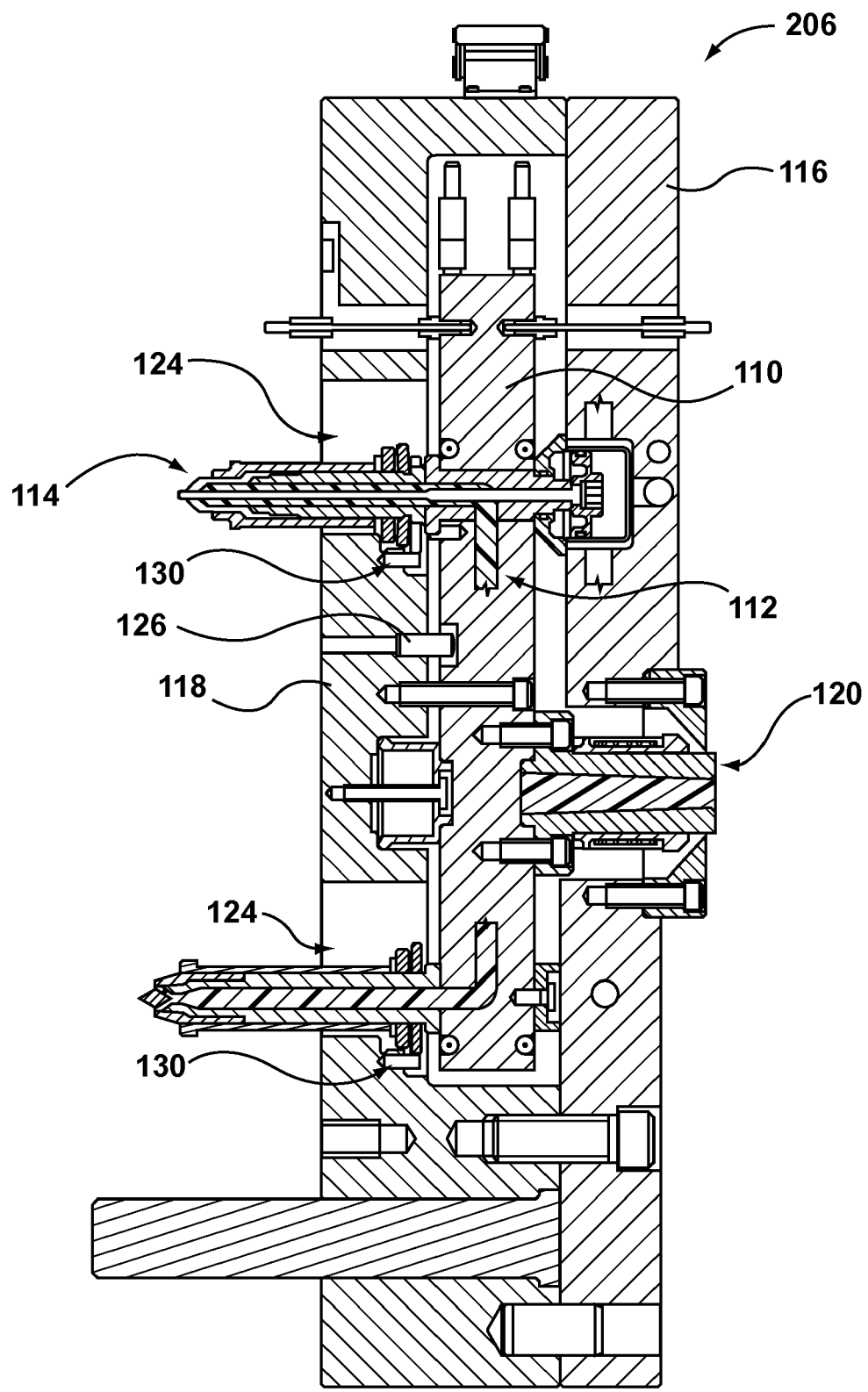
FIG. 3 is a cross-sectional view of the hot runner of FIG. 2.
Figure 4:
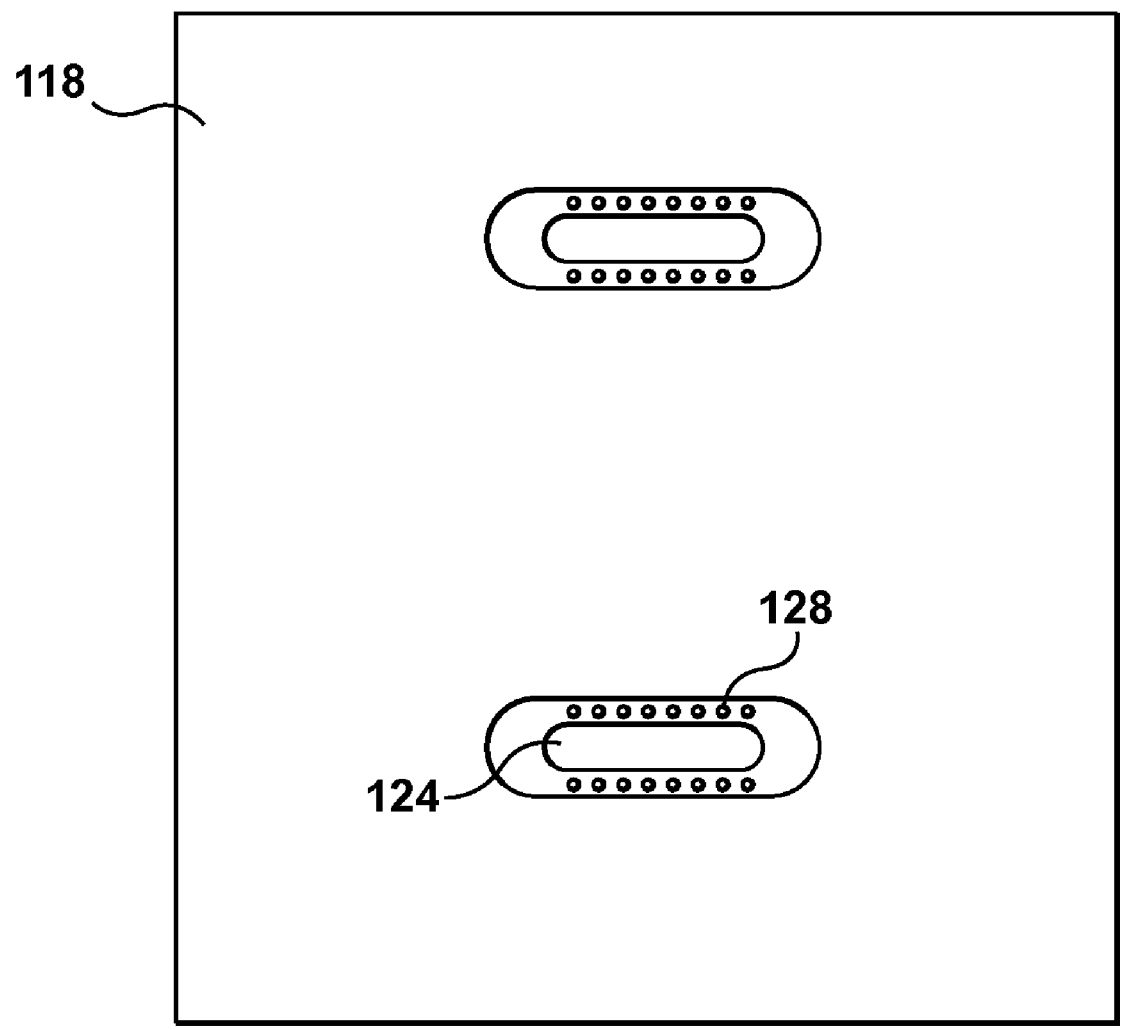
FIG. 4 is a top view of a manifold plate according to an embodiment of the present invention.

As can be seen most clearly in FIGS. 3 and 5, each nozzle 114 protrudes through and extends out of the manifold plate 118. In prior art hot runner systems as shown in FIG. 1, a plate bore 24 is provided in the manifold plate 12 to accommodate each nozzle 6, and the plate bore 24 is sized to match, with some clearance, the outside diameter of the nozzles 6. In one embodiment disclosed herein, the manifold plate 118 is provided with plate slots 124. For example as shown in FIG. 4, these plate slots 124 are provided with a first lateral dimension—the width—that matches, again, with some clearance, the outside diameter of the nozzles 114. However, the plate slots 124 are provided with a second lateral dimension—the length—significantly longer than the diameter of the nozzles 114 such that the nozzles 114 may be positioned in multiple locations along that slot length, thus providing the desired positioning flexibility. The length of the plate slots 124 may utilize any number of dimensions and is limited only by the nozzle configuration used in the hot runner system and thermal considerations.

Figure 6:
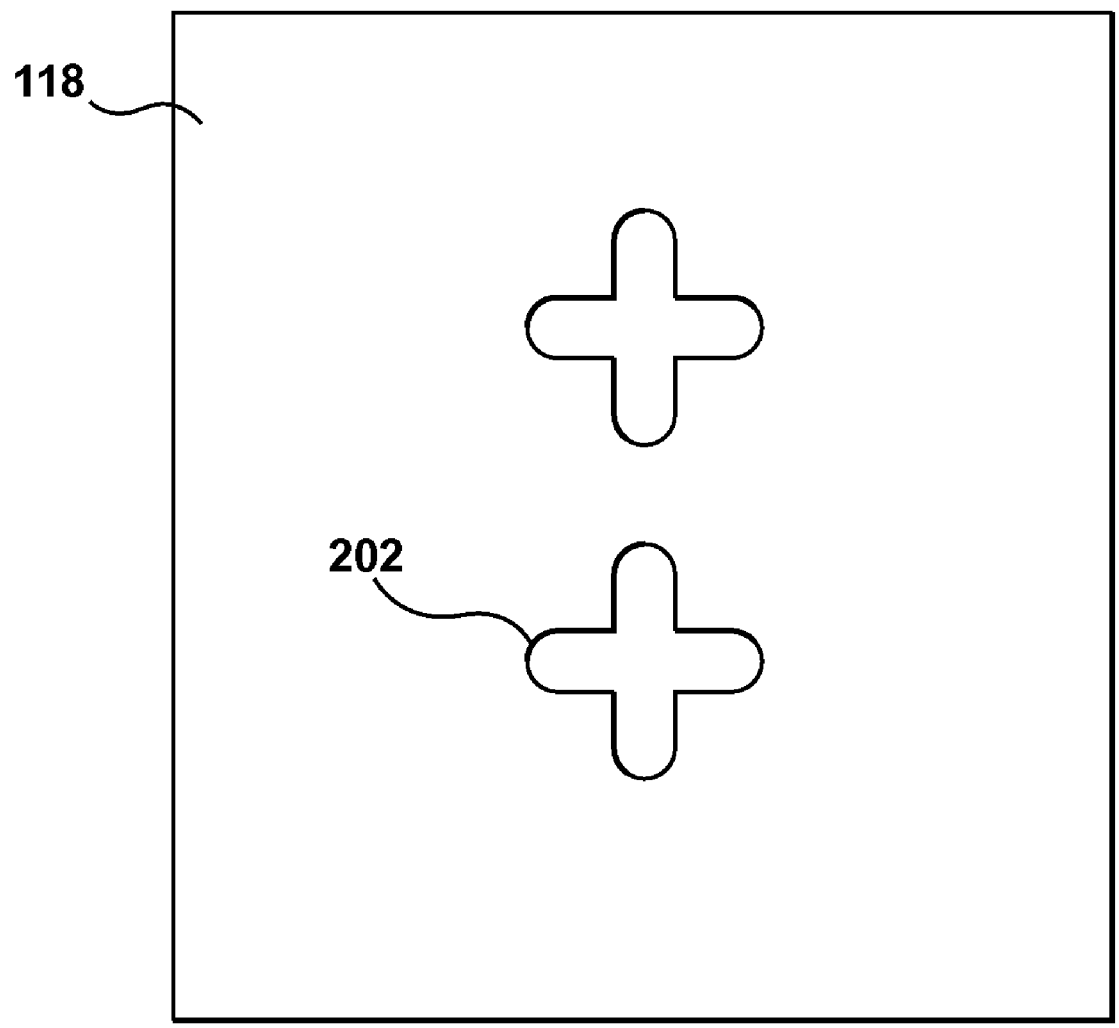
FIG. 6 is a bottom view of a manifold plate according to another embodiment of the present invention.
Figure 7:
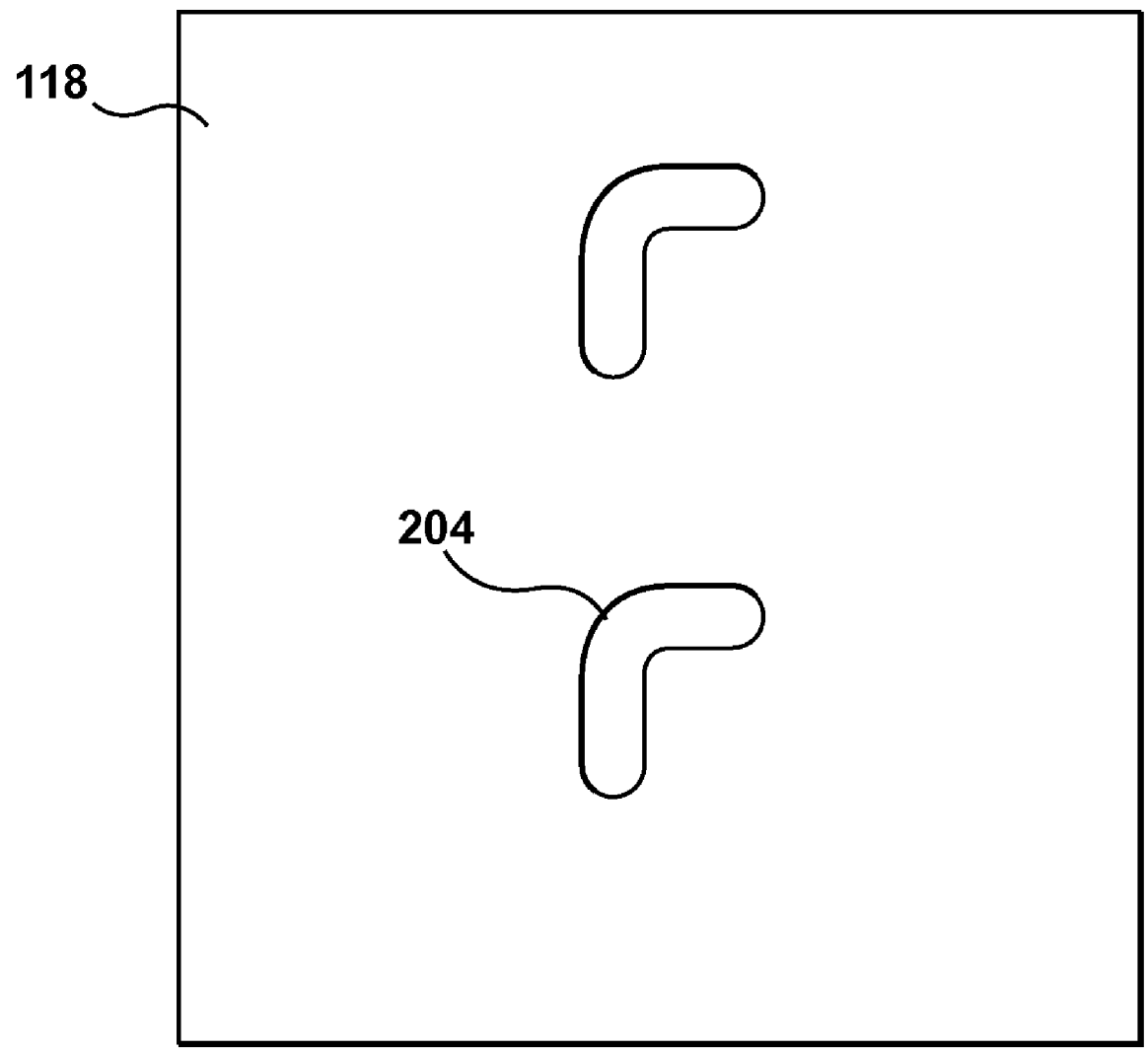
FIG. 7 is a bottom view of a manifold plate according to another embodiment of the present invention.

While an elongated slot has been previously described, it is contemplated as being within the scope of the present invention to use expanded openings in a variety of configurations. FIGS. 6 and 7 illustrate a number of non-limiting examples including a multi-leg slot 202, and an L-shaped slot 204. Thus, the term "plate slots" is intended to be non-limiting as to the shape of the enlarged opening contemplated by the present invention. The rounded ends or corners of such shapes obviously being intended to accommodate the rounded diameter of the nozzles 114.

It is typical in a hot runner system 206 for dowels 126 to be used to position the manifold 110, and consequently the nozzles 114, relative to the manifold plate 118 as is shown in FIGS. 3 and 5. These dowels 126 are frequently positioned between the nozzles 114 such that they do not directly relate to the plate bores or in the case of the present invention, plate slots 124. However, in an alternate embodiment of the present invention illustrated in FIG. 4, an additional multi-position positive locating mechanism may be incorporated in the plate slots 124 previously described. In one version of this embodiment, a plurality of dowel holes 128 are provided along the perimeter of the plate slots 124 to accommodate additional dowels 130 associated with each individual nozzle 114. The plurality of dowel holes 128 allow positive locating of the nozzles 114 relative to the plate slots 124 in the multiple positions within the plate slots 124.

In another version of this embodiment, screws 132 are utilized as the positioning device rather than dowels 130. In this version, a plurality of screw through holes 134 are positioned along the perimeter of the plate slots 124, and the screws 132 are inserted into those holes 134 from outside of the manifold plate 118 and into a threaded hole (not shown) associated with each nozzle 114.

Figure 10:
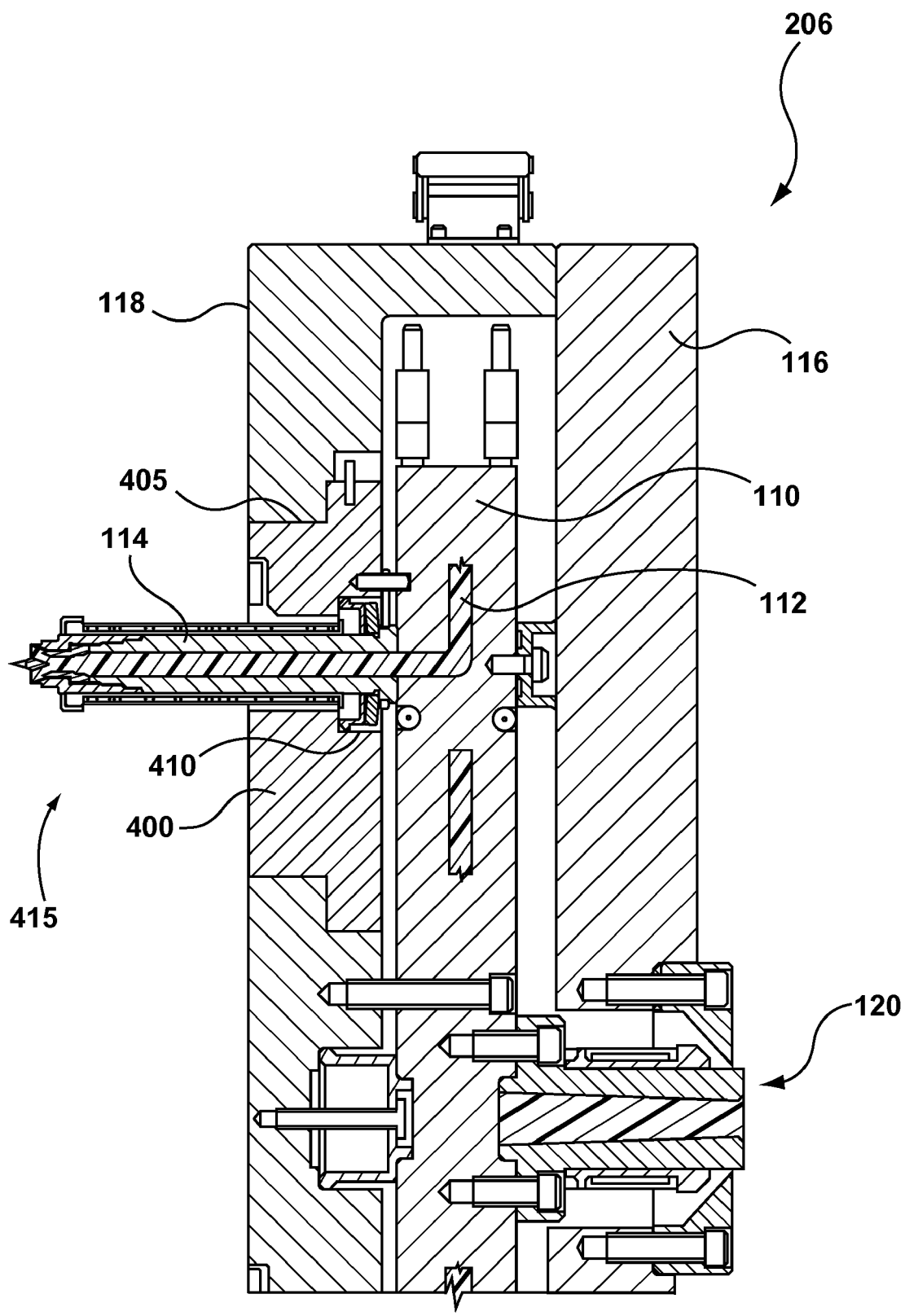
FIG. 10 is a cross-sectional view of a partial hot runner according to another embodiment of the present invention showing a nozzle insert in the manifold plate for a hot tip nozzle system.

In yet another embodiment of the present invention, the hot runner system 206 has nozzles 114 of the hot tip style configuration 415. In this embodiment, the hot runner system 206 has a nozzle insert 400 used to locate each of the nozzles 114 within the manifold plate 118. As illustrated in FIG. 10, the manifold plate 118 has at least one manifold plate cavity 405 to accept at least one nozzle insert 400, the nozzle insert 400 having a nozzle bore 410 therethrough for installation of said nozzle 114. The nozzle bore 410 is sized precisely to locate the nozzle 114 on its diameter to ensure exact alignment relative to the mold (not shown); however, the nozzle bore 410 may be located at a plurality of positions within the nozzle insert 400 to match the mold gate or location.

With the hot tip style configuration 415 in FIG. 10, the nozzle insert 400 need only be installed in the manifold plate 118, whereas in the case of a valve gate style configuration 420, as shown in FIG. 11, at least one piston cylinder insert 425 is also required to be installed in the backing plate 116. The backing plate 116 has at least one backing plate cavity 435 to accept at least one piston cylinder insert 425, the at least one piston cylinder insert 425 having a cylinder bore 440 therein for installation of a piston cylinder 445, required to control actuation of a valve stem 430. The at least one piston cylinder insert 425 is sized to fit the backing plate cavity 435, and may have a plurality of external geometries 455 to match a plurality of internal geometries 465 of the backing plate cavity 435. The at least one piston cylinder insert 425 may also be plumbed with a plurality of conduits 450 necessary to provide a driving force to actuate said valve stem 430.

The interchangeability of a plurality of nozzle inserts 400 in a manifold plate cavity 405, or at least one piston cylinder insert 425 in a backing plate cavity 435, renders said manifold plate 118 and said backing plate 116 reusable when married to a plurality of molds (not shown) as the nozzle 114 can be located at a plurality of locations as illustrated in FIGS. 11A and 11B by dimension 'X'.

Figure 12B:
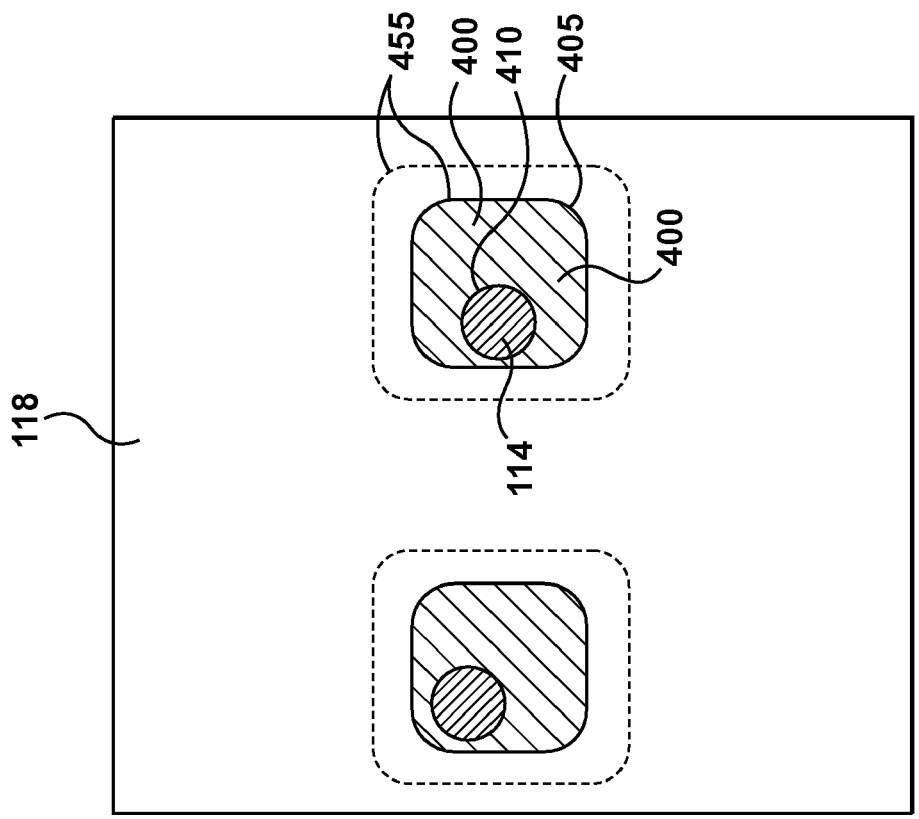
FIG. 12B is a plan view of a manifold plate showing both the external geometry of the nozzle insert as well as a plurality of nozzle bore locations therethrough.
Figure 12A:
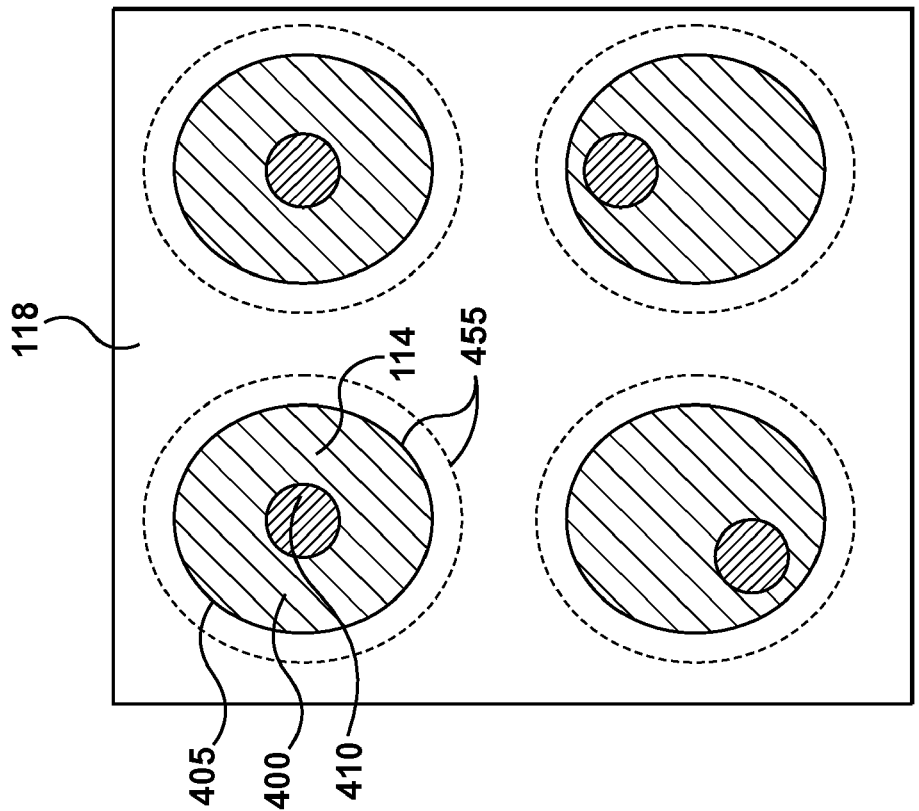
FIG. 12A is a plan view of a manifold plate showing both the external geometry of the nozzle insert as well as a plurality of nozzle bore locations therethrough.

As illustrated in FIGS. 12A and 12B, the nozzle insert 400 may have a plurality of external geometries 455 to match a plurality of internal geometries 465 of the manifold plate cavity 405. Additionally, within the nozzle insert 400, the nozzle bore 410 may be installed in a plurality of lateral positions thus offering flexibility of positioning a nozzle 114 within the manifold plate 118 by replacing the nozzle insert 400.

Figure 13B:
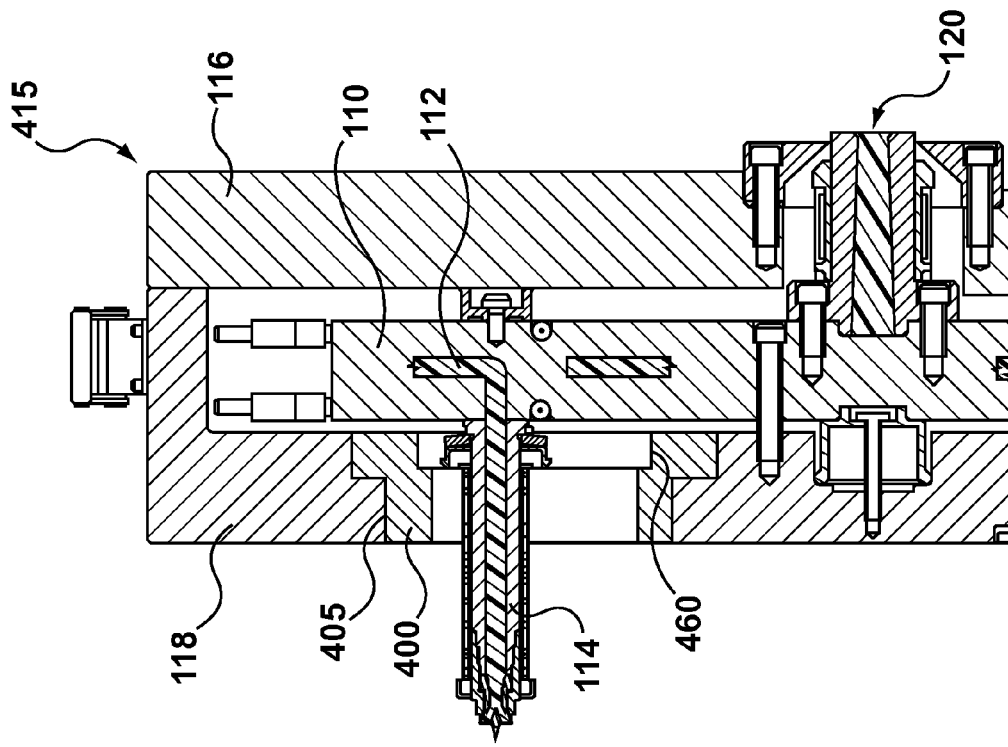
FIG. 13B is a cross-sectional view of the embodiment of FIG. 13A illustrating the insert slot of the nozzle insert.
Figure 13A:
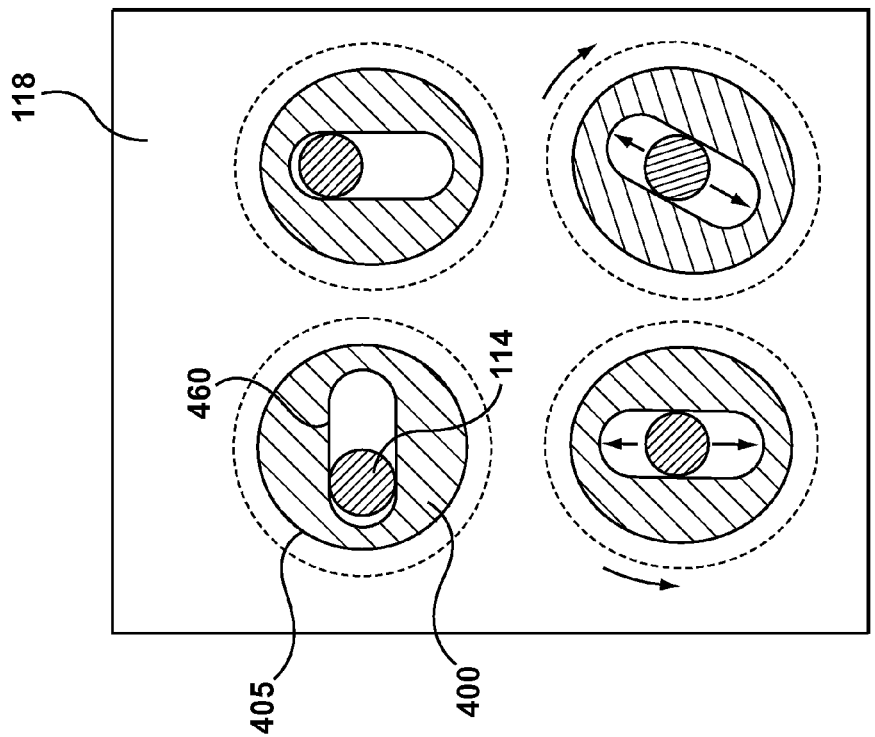
FIG. 13A is a plan view of a manifold plate showing a plurality of nozzle inserts each having an insert slot and illustrating a plurality of positions of the nozzle therein.

An extension of the aforementioned embodiment is illustrated in FIG. 13A wherein the nozzle insert 400 has at least one insert slot 460 which allows the nozzle 114 to extend through the nozzle insert 400. In this embodiment, the insert slot 460 is provided with a first lateral dimension—the width—that matches, again, with some clearance, the outside diameter of the nozzle 114. However, the insert slot 460 is provided with a second lateral dimension—the length—significantly longer than the diameter of the nozzle 114 such that the nozzle 114 may be positioned in a plurality of locations along the length of the insert slot 460, thus providing the desired positioning flexibility. The length of the insert slot 460 may utilize any number of dimensions and is limited only by the configuration of the nozzles 114 and thermal considerations. Additionally, the nozzle insert 400 may be rotated within the manifold plate cavity 405 allowing for yet another variation of positioning of the axis of the nozzle 114. A cross sectional view of a hot tip style configuration 415 shown in FIG. 13B shows the nozzle 114 as it is engaged in an insert slot 460 of FIG. 13A.

While an insert slot 460, which is elongated, has been previously described, it is contemplated as being within the scope of the present invention to use expanded openings in a variety of configurations. Referring back to FIGS. 6 and 7, a number of non-limiting examples including a multi-leg slot 202, and an L-shaped slot 204 are illustrated and may be interpreted for the same use within the nozzle insert 400 itself. Thus, the term "insert slot" 460 is intended to be non-limiting as to the shape of the enlarged opening contemplated by the present invention. Again, the rounded ends or corners of such shapes obviously being intended to accommodate the rounded diameter of the nozzles.

Figure 14:
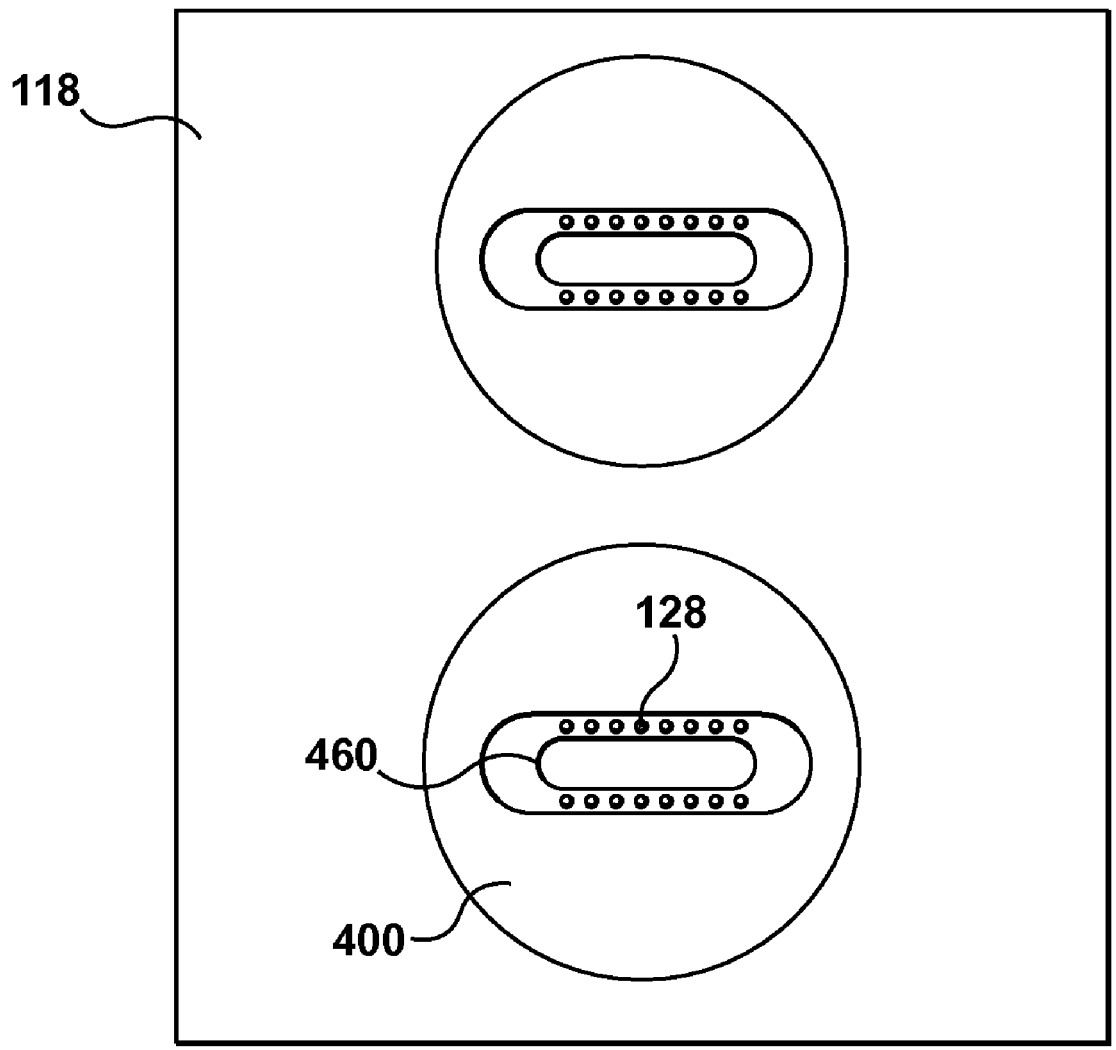
FIG. 14 is a top view of a manifold plate according to an embodiment of the present invention which uses dowel holes adjacent to an insert slot to positively locate a nozzle.

In FIG. 14, yet another embodiment of the present invention illustrates that an additional multi-position positive locating mechanism may also be incorporated in the nozzle insert 400, and more specifically, in the insert slot 460 previously described. In one version of this embodiment, a plurality of dowel holes 128 are provided along the perimeter of the insert slot 460 to accommodate additional dowels 130 associated with each individual nozzle 114. The plurality of dowel holes 128 allow positive locating of the nozzle 114 relative to the insert slot 460 in multiple positions within the insert slot 460.

In yet another version of this embodiment, screws 132 are utilized as the positioning device rather than utilizing a dowel 130. In this version, a plurality of screw through holes 134 are positioned along the perimeter of the insert slot 460, and the screws 132 are inserted into said through holes 134 from the outside of the nozzle insert 400 and into a threaded hole (not shown) associated with each nozzle 114.

Figure 15:
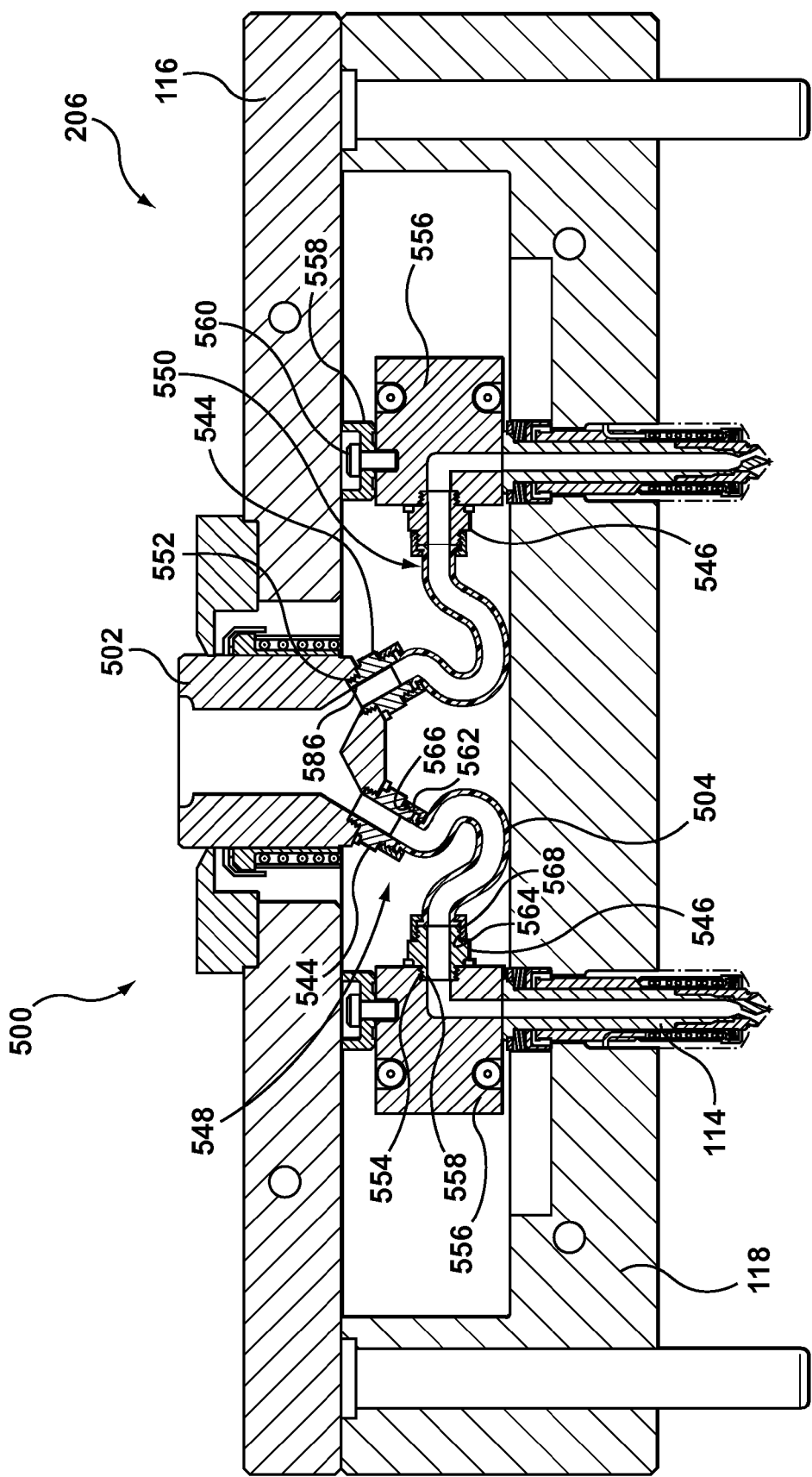
FIG. 15 is a cross-sectional view of a reconfigurable hot runner in one position.
Figure 16:
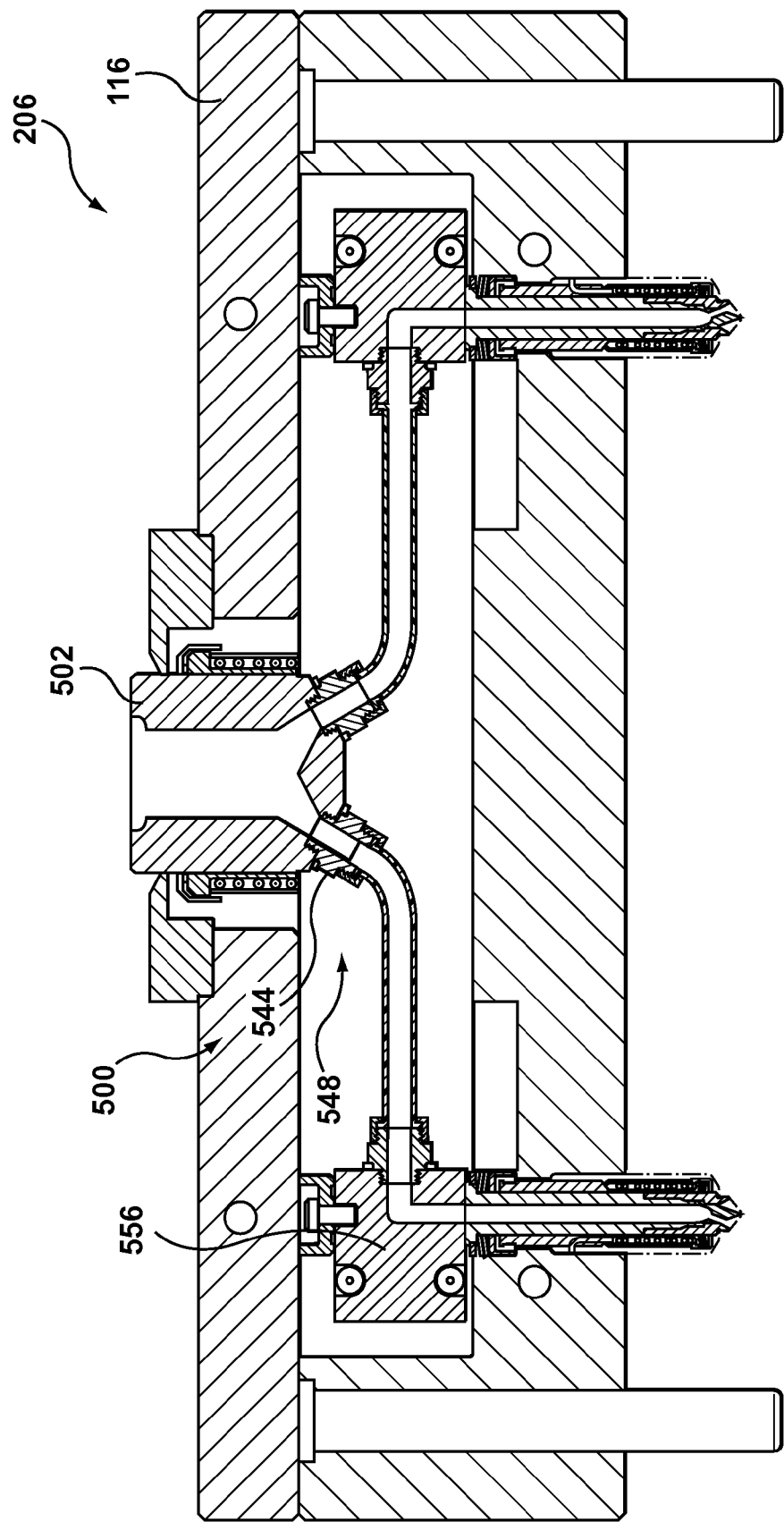
FIG. 16 is a cross-sectional view of a reconfigurable hot runner in another position.

Turning now to yet another embodiment of the present invention, FIGS. 15 and 16 illustrate the hot runner system 206 with a melt distribution system 500 that can be reused and reconfigured to accommodate various drop or nozzle 114 locations. The previous discussions dealt with manifold plates 118 and backing plates 116 that provided the flexibility of varying the location of the drops or nozzles 114. The following discussion will describe the melt distribution system 500 that complements the manifold plates 118 and the backing plates 116 that are adjustable, reconfigurable, and reusable, thereby providing a complete hot runner system that provides the flexibility of varying drop or nozzle 114 locations. Therefore, it will become apparent to those skilled in the art after reading the following description that this embodiment encompasses a hot runner system 206 that is fully reconfigurable and reusable to different drop or nozzle 114 locations.

In this embodiment, the melt distribution system 500 has a melt distributor 502 that is used in place of the sprue 120 previously described. In addition, the melt distribution system 500 has a melt conduit 504 for each drop or nozzle 114. The melt conduits 504 in this embodiment replace what is referred to as the manifold 110 in the previously described embodiments. The melt conduits 504 operatively and fluidly connect the melt distributor 502 to nozzle headers 556 of the nozzles 114 of the melt distribution system 500. The melt distribution system 500 also includes outlets 544 that are operatively connected to a first end 548 of the melt conduit 504, and the melt distributor 502. The melt distribution system 500 also includes inlets 546 that are operatively connected to a second end 550 of the melt conduit 504, and the nozzle headers 556. Non-limiting embodiments of how the inlets 546 and the outlets 544 are attached to the melt distributor 502, melt conduits 504, nozzle headers 556 are described in more detail hereinafter. Those having ordinary skill in the art will understand that the inlets 546 and the outlets 544 are just one example of fittings that may be used to connect the melt conduits 504 to the melt distributor 502 and nozzle headers 556. In another embodiment, for example, first ends 548, and second ends 550 of the melt conduit 504 are soldered, brazed, welded, or affixed directly to the melt distributor 502 and nozzle headers 556. Those having ordinary skill in the art will appreciate that the number of inlets 546 and the number of outlets 544 will preferably coincide with the number of the melt conduits 504. In summary, the main components of the melt distribution system 500 include the melt distributor 502, the outlets 544, the melt conduit 504, the inlets 546, the nozzle headers 556, and the nozzles 114.

The nozzle headers 556 are removably and adjustably mounted between the manifold plate 118 and the backing plate 116, and more specifically between the nozzles 114 and the backing plate 116. Spacers 590 and screws 560 are used to firmly position the nozzles 114 and nozzle headers 556. The nozzles 114 are operatively mounted to the nozzle headers 556 in much the same way that nozzles 114 are operatively mounted to manifolds 110 as is known by those having ordinary skill in the art, which includes but is not limited to sliding connections, screwed-in connections, and mechanically fastened connections. In an alternative embodiment, each nozzle 114 and nozzle header 556 pair are one-piece or a unitary structure. The nozzle headers 556 are used to direct the flow of molten material from the melt conduit 504 to the nozzles 114, which is typically, but not required, at a 90 degree offset. The nozzle headers 556 are movable between the backing plate 116 and the manifold plate 118. This allows the nozzle headers 556 and thus the nozzles 114 to be moved to various locations. For example in FIG. 16, the nozzle headers 556, nozzles 114, and melt conduits 504 are placed in a fully extended position. Thereafter for example, the nozzle headers 556, nozzles 114, and melt conduit 504 may be moved into one of the "relaxed" or not fully extended positions (hereinafter referred to as "intermediate positions"). The intermediate positions are any position between the melt distributor 502, and the nozzles 114 in the fully extended position.

Those having ordinary skill in the art will appreciate that the melt distribution system 500 described with respect to FIGS. 15 and 16, having the movable nozzle headers 556 and nozzles 114 along with the reconfigurable melt conduit 504, may be used with the flexible plate systems (i.e., manifold plates 118 and backing plates 116 having means for varying drop or nozzle 114 locations) described with respect to FIGS. 2-14. For example in the embodiment described with regard to FIG. 4, the plate slots 124 are provided with a first lateral dimension—the width—that matches with some clearance, the outside diameter of the nozzles 114, and a second lateral dimension—the length—significantly larger than the diameter of the nozzles 114 such that the nozzles 114 may be positioned in multiple locations along that slot length, thus providing the desired positioning flexibility. The melt distribution system 500 described with respect to FIGS. 15 and 16, having the movable nozzle headers 556 and nozzles 114 along with the reconfigurable melt conduits 504, may be moved along the length of the second lateral dimension of the plate slots 124 to accommodate the desired drop or nozzle 114 location. Those having ordinary skill in the art will appreciate that the foregoing provides a melt distribution system 500 that can be reused and reconfigured to accommodate various designs having varying drop or nozzle 114 locations such as those locations along the second lateral dimension (length) of the plate slots 124 in FIG. 4.

In another non-limiting example, the melt distribution system 500 discussed in relation to FIGS. 15 and 16 may be used with the multi-leg slot 202 and the L-shaped slot 204 discussed with respect to FIGS. 6 and 7, respectively. It should be noted that the previously described elongated slots or openings are non-limiting examples. The melt distribution system 500 may be used with other slots, shapes of slots, and expanded openings in a variety of configurations.

In another non-limiting example, the melt distribution system 500 discussed in relation to FIGS. 15 and 16 may be used with the nozzle inserts 400 described with respect to FIGS. 10, 12A, and 12B. Thus, when the nozzle inserts 400 are installed in a plurality of lateral positions, the melt distribution system 500 including the nozzle headers 556, nozzles 114, and the melt conduits 504 may be moved or adjusted to accommodate the drop or nozzle 114 locations.

In another non-limiting example, the melt distribution system 500 discussed in relation to FIGS. 15 and 16 may be used with the nozzle inserts 400 having the insert slots 460 therein described with respect to FIGS. 13A, and 13B. The insert slots 460 are provided with a second lateral dimension—the length—significantly larger than the diameter of the nozzles 114 such that the nozzles 114 may be positioned in a plurality of locations along the length of the insert slots 460, thus providing the desired positioning flexibility. The length of the insert slots 460 may utilize any number of dimensions and is limited only by the configuration of the nozzles 114 and thermal considerations. Additionally, the nozzle inserts 400 may be rotated within the manifold plate cavity 405 allowing for yet another variation of positioning of the nozzles 114. Thus, when the insert slots 460 location are selected from the plurality of lateral positions, the melt distribution system 500 including the nozzle headers 556, nozzles 114, and melt conduit 504 may be moved or adjusted to accommodate the drops or nozzles 114 location.

It should be noted that the aforementioned examples are not meant to be limiting but rather to give examples of how the melt distribution system 500 allows for movement of the nozzles 114 to various gate locations. Obviously, one melt distribution system 500 may be used to accommodate various backing plates 116 and manifold plates 118 having different nozzle 114 locations instead of purchasing a manifold 110 and associated nozzles 114 for each and every set of backing plate 116 and manifold plate 118 configurations having different gate locations.

FIG. 16 illustrates the melt conduits 504 in a fully extended position. With regard to FIG. 15, the melt conduits 504 are shown in two of the intermediate positions. In the intermediate positions, the melt conduits 504 may have a generally S-shaped configuration, C-shaped configuration, U-shaped configuration, or other shaped configuration for accommodating various lengths of the melt conduits 504 required for movement into the fully extended position as is shown in FIG. 16. The melt conduits 504 are bendable or flexible for movement from one position to another (i.e., from the fully extended position to any one of the intermediate positions or vice versa).

In one embodiment of the melt conduits 504, the melt conduits 504 may be electrically heated high temperature and pressure Teflon core hoses, such as the Electraflo II, Series D Hoses and specifically Model DTM Standard Hose Core sold by Diebolt & Company, who is located at 17 Charles Street, Old Lyme, Conn. 06371.

The melt conduits 504 may be permanently attached or removably attached to the melt distributor 502 and nozzle headers 556. With regard to the removably attached embodiment, the inlets 546 have first threaded ends 554 for mating with threaded ends 558 of the nozzle headers 556. The outlets 544 have first threaded ends 552 for mating with threaded ends 586 of the melt distributor 502. The inlets 546 have second threaded ends 564 for mating with threaded ends 568 of the melt conduits 504. The outlets 544 have second threaded ends 562 for mating with the threaded ends 566 of the melt conduits 504. The threaded ends 566, 568 of the melt conduits 504 are threaded onto the second threaded ends 562, 564 of the outlets 544 and the inlets 546, respectively.

Other objects, features and advantages of the present invention will be apparent to those skilled in the art. While preferred embodiments of the present invention have been illustrated and described, this has been by way of illustration and the invention should not be limited except as required by the scope of the appended claims and their equivalents.

We claim:

1. A melt distribution system, comprising:
   a melt distributor for receiving a melt from a source;
   at least one melt conduit in downstream fluid communication with the melt distributor;

at least one nozzle in downstream fluid communication with and operatively connected to the at least one melt conduit; and wherein the at least one nozzle is movable from a first position to a second position while remaining operatively connected to the at least one melt conduit and while the at least one melt conduit remains in fluid communication with the melt distributor, the at least one nozzle and the at least one melt conduit are movable between intermediate positions, and the at least one melt conduit is bendable for movement between the intermediate positions.

2. The melt distribution system according to claim 1, further comprising a nozzle header operatively mounted between the at least one nozzle and the at least one melt conduit.

3. The melt distribution system according to claim 1, wherein the at least one nozzle is movable from the second position to a third position.

4. The melt distribution system according to claim 3, further comprising at least one outlet operatively mounted between the melt distributor and a first end of the at least one melt conduit.

5. The melt distribution system according to claim 4, further comprising at least one inlet operatively mounted between a nozzle header and a second end of the at least one melt conduit.

6. The melt distribution system according to claim 5, wherein the first end of the at least one melt conduit is removably attached to the at least one outlet.

7. The melt distribution system according to claim 6, wherein the second end of the at least one melt conduit is removably attached to the at least one inlet.

8. A melt distribution system, comprising:
a melt distributor for receiving melt from a source;
at least one melt conduit in downstream fluid communication with the melt distributor;
at least one nozzle in downstream fluid communication with the at least one melt conduit; and
wherein in non-use, the at least one melt conduit permits movement of the at least one nozzle from a first position to a second position without disconnecting the at least one nozzle from the at least one melt conduit of the melt distribution system, the at least one nozzle and the at least one melt conduit are movable between intermediate positions, and the at least one melt conduit is bendable for movement between the intermediate positions.

9. The melt distribution system according to claim 8, further comprising a nozzle header operatively mounted between the at least one nozzle and the at least one melt conduit.

10. The melt distribution system according to claim 8, wherein the at least one nozzle is movable from the second position to a third position.

11. The melt distribution system according to claim 10, further comprising at least one outlet operatively mounted between the melt distributor and a first end of the at least one melt conduit.

12. The melt distribution system according to claim 11, further comprising at least one inlet operatively mounted between a nozzle header and a second end of the at least one melt conduit.

13. The melt distribution system according to claim 12, wherein the first end of the at least one melt conduit is removable attached to the at least one outlet.

14. The melt distribution system according to claim 13, wherein the second end of the at least one melt conduit is removable attached to the at least one inlet.

15. The melt distribution system according to claim 1, further comprising:
a manifold plate;
the melt distribution system is positioned adjacent said manifold plate, said at least one nozzle having an outside diameter; and
wherein said manifold plate defines at least one plate slot therein, said at least one plate slot allowing said at least one nozzle to extend through said manifold plate and having at least a first lateral dimension substantially larger than said outside diameter of said at least one nozzle.

16. The melt distribution system according to claim 15, wherein:
the melt distributor for receiving the melt from the source;
the at least one melt conduit in downstream fluid communication with the melt distributor;
the at least one nozzle in downstream fluid communication with and operatively connected to the at least one melt conduit; and
wherein the at least one nozzle is movable from the first position to the second position in the at least one plate slot while remaining operatively connected to the at least one melt conduit and while the at least one melt conduit remains in fluid communication with the melt distributor.

17. The melt distribution system according to claim 16, wherein said at least one plate slot has at least a second lateral dimension substantially larger than said outside diameter of said at least one nozzle.

18. The melt distribution system according to claim 16, wherein said at least one plate slot comprises a multi-leg slot or L-shaped slot.

19. The melt distribution system according to claim 16, further comprising a nozzle header operatively mounted between the at least one nozzle and the at least one melt conduit.

20. The melt distribution system according to claim 16, wherein the at least one nozzle is movable from the second position to a third position in the at least one plate slot.

* * * * *